United States Patent
Wang

(10) Patent No.: US 6,919,878 B2
(45) Date of Patent: Jul. 19, 2005

(54) KEYBOARD/MOUSE SWITCHING CONTROLLER

(75) Inventor: Cheng-Chih Wang, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 237 days.

(21) Appl. No.: 10/268,651

(22) Filed: Oct. 9, 2002

(65) Prior Publication Data

US 2003/0122778 A1 Jul. 3, 2003

(30) Foreign Application Priority Data

Dec. 28, 2001 (TW) .................................... 90133034 A

(51) Int. Cl.⁷ ................................................ G09G 5/08
(52) U.S. Cl. .................... 345/163; 345/168; 361/680; 710/73
(58) Field of Search .............................. 710/62–64, 73, 710/36, 38; 345/163, 164, 165, 166, 167, 168, 169, 170, 171, 172, 156; 341/22, 23; 361/680, 681; 703/25

(56) References Cited

U.S. PATENT DOCUMENTS

| | | | | |
|---|---|---|---|---|
| 5,590,315 A | * | 12/1996 | Hess et al. | 703/25 |
| 6,112,264 A | * | 8/2000 | Beasley et al. | 710/38 |
| 6,373,500 B1 | * | 4/2002 | Daniels | 345/632 |
| 6,469,690 B1 | * | 10/2002 | Abraham et al. | 345/156 |
| 6,718,415 B1 | * | 4/2004 | Chu | 710/301 |
| 2002/0087753 A1 | * | 7/2002 | Beasley et al. | 710/38 |
| 2003/0073342 A1 | * | 4/2003 | Geyer | 439/489 |

* cited by examiner

Primary Examiner—Xiao Wu
(74) Attorney, Agent, or Firm—Ladas & Parry LLP

(57) ABSTRACT

A keyboard/mouse switching controller and method thereof. The present invention is applied to a computer system where a keyboard and a mouse have the same connectors. The present invention determines whether a keyboard and a mouse are coupled to a wrong connector by detecting the keyboard and the mouse using a system BOIS. If a keyboard or a mouse is coupled to a wrong connector, the switching circuit switches the keyboard signal and the mouse signal, thereby transmitting the keyboard signal and the mouse signal to the computer system correctly.

12 Claims, 3 Drawing Sheets

KEYBOARD/MOUSE SWITCHING CONTROLLER

BACKGROUND OF THE INVENTION

1. Field of the Invention

The present invention relates to a controlling technology of a computer peripheral component, more particularly to a keyboard/mouse switching controller and control method thereof. The present invention is applied to a computer system where a keyboard and a mouse have the same connectors. The present invention switches the keyboard signal and the mouse signal selectively, thereby transmitting the keyboard signal and the mouse signal to the computer system correctly.

2. Description of the Related Art

In the present day, mice and keyboards are basic input device of the computer systems. As to the ATX main board standards proposed by Intel, mice and keyboards have the same interface called the PS/2 interface. The PS/2 interface is a standard proposed by IBM in 1987. The PS/2 interface comprises a data pin (pin-1), a clock pin (pin-5), a ground pin (pin-3) and a power pin (pin-4). Pin-2 and pin-6 are not used. FIG. 1 is a schematic diagram illustrating the conventional mouse/keyboard interface structure in computer systems. In FIG. 1, a keyboard connector 10 is coupled to a keyboard/mouse controller 14 by a keyboard data signal line KDAT and a keyboard clock signal line KCLK. A mouse connector 12 is coupled to the keyboard/mouse controller 14 by a mouse data signal line MDAT and a mouse clock signal line MCLK. The keyboard/mouse controller has a basic input/output system (hereinafter referred to as a controller BIOS), thereby transmitting data to a host interface. For example, the keyboard/mouse controller is a 8042 microcontroller. However, a user assembling a computer may be confused when installing the mouse and the keyboard because both the keyboard connector and the mouse connector are PS/2. If the user mistakenly connects the mouse to the keyboard connector and/or the keyboard to the mouse connector, the computer system is interrupted and doesn't work normally.

SUMMARY OF THE INVENTION

It is therefore an object of the present invention to provide a keyboard/mouse switching controller. The circuit can determine whether the keyboard and the mouse are coupled to correctly using the system BIOS to detect the devices coupled to the keyboard connector and the mouse connector. Therefore, if a mouse is coupled to the keyboard connector, or a keyboard is coupled to the mouse connector, the controlling circuit switches the keyboard signal and the mouse signal without changing the controller BIOS or restarting and then exchanging the connectors. Hence, the present invention makes setting up a computer easier.

To obtain the object above, the present invention provides a keyboard/mouse switching controller having a keyboard connector, a mouse connector, a first group of signal lines, a second group of signal lines, a third group of signal lines, a fourth group of signal lines, a switching circuit, a detector and a controller. The first group of signal lines and the second group of signal lines are coupled to the keyboard connector and the mouse connector respectively, the first group of signal lines for receiving a first group of signals from the keyboard connector, and the second group of signal lines for receiving a second group of signals from the mouse connector.

The detector transmits a control signal wherein the control signal is at a low level state when a mouse is connected to the keyboard connector or a keyboard is connected to the mouse connector, the control signal is at a high level state when a keyboard is connected to the keyboard connector or a mouse is connected to the mouse connector. The controller is coupled to the detector for controlling the first group of signals and the second group of signals output to the detector. The third group of signal lines and the fourth group of signal lines are coupled to the controller. The switching circuit couples the first and the second group of signals to the third and fourth group of signal lines respectively when the control signal is at the high level state, and couples the first and second group of signals to the fourth and third group of signal lines respectively when the control signal is at low level state. Hence, the computer system can transmit the keyboard signal and the mouse signal correctly to keep computer system working normally without changing the controller BIOS.

Furthermore, another object of the present invention is to provide a method of keyboard/mouse switch controlling for managing a keyboard signal and a mouse signal. According to the present invention, the method of keyboard/mouse switch controlling comprises the steps of:

Detecting whether a keyboard is connected to a keyboard connector or a mouse is connected to a mouse connector;

Outputting a control signal at a high level state when the keyboard is connected to the keyboard connector or the mouse is connected to the mouse connector, and outputting the control signal at a low level state when the keyboard is connected to the keyboard connector or the mouse is connected to the mouse connector;

Coupling a first group of signal lines connected to the keyboard connector to a third group of signal lines connected to a controller and a second group of signal lines connected to the mouse connector to a fourth group of signal lines connected to the controller when the control signal is at high level state; and Coupling a first group of signal lines connected to the keyboard connector to a fourth group of signal lines connected to a controller and the second group of signal lines connected to the mouse connector to the third group of signal lines connected to the controller when the control signal is at low level state.

BRIEF DESCRIPTION OF THE DRAWINGS

The following detailed description, given by way of example and not intended to limit the invention solely to the embodiment described herein, will best be understood in conjunction with the accompanying drawings in which.

DETAILED DESCRIPTION OF THE INVENTION

Embodiments of the present invention will be described below with reference to the drawings.

Figure 1:
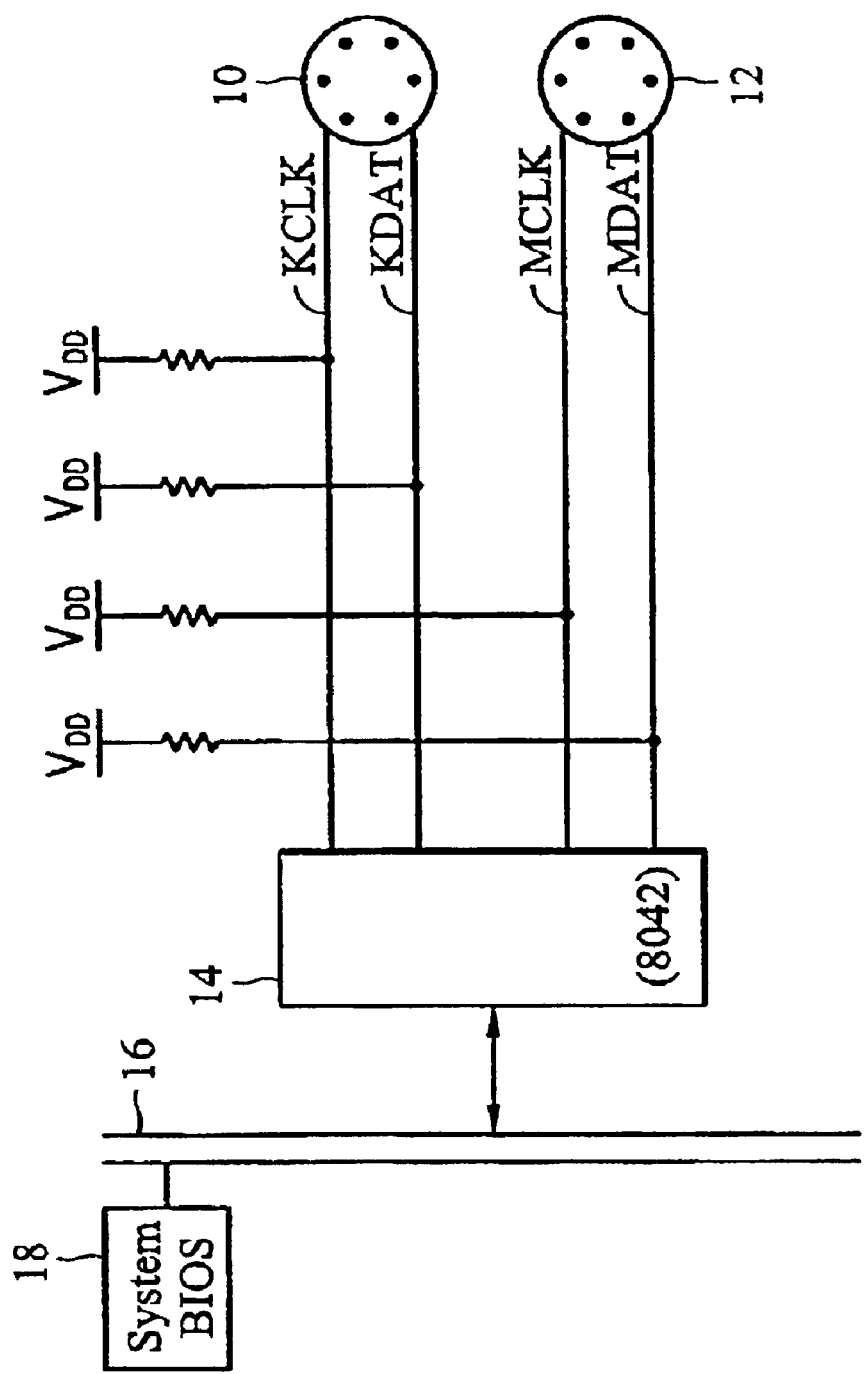
FIG. 1 shows a conventional keyboard/mouse interface structure in computer systems.
Figure 2:
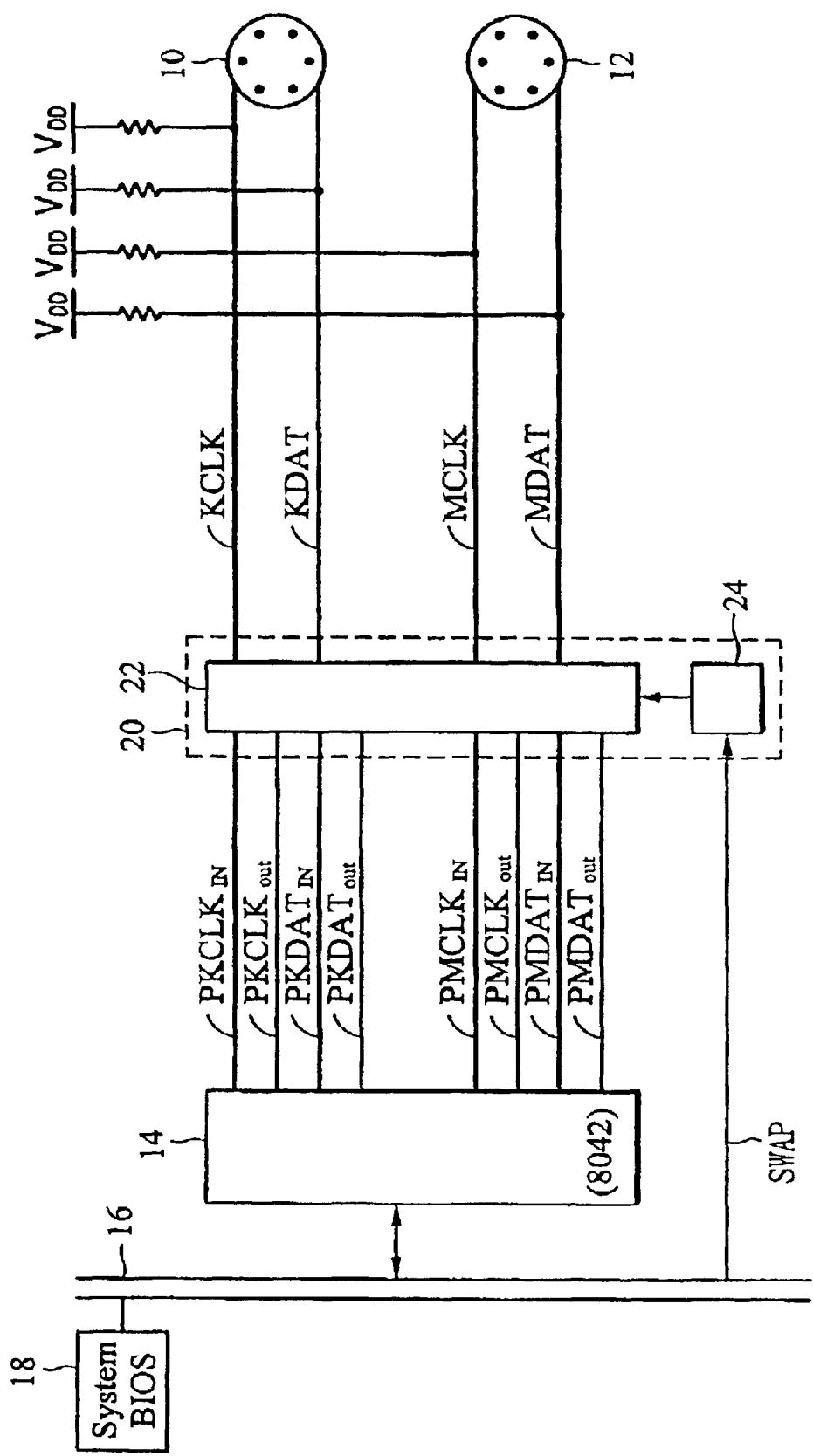
FIG. 2 is a schematic diagram illustrating the keyboard/mouse switching controller according to the present invention.

FIG. 2 shows a schematic diagram according to the keyboard/mouse switching controller of present invention. In FIG. 2, the keyboard/mouse switching controller comprises a keyboard/mouse controller 14 and a switching control circuit 20. For example, the keyboard/mouse controller is a 8042 microcontroller and the switching control circuit 20 is coupled between a keyboard connector 10 and the keyboard/mouse controller 14. Furthermore, the first group of signal lines comprises a keyboard data signal line KDAT and a keyboard clock signal line KCLK and the second group of signal lines comprises a mouse data signal line MDAT and a mouse clock signal line MCLK. A keyboard may transmit keyboard signals comprising a keyboard clock signal and a keyboard data signal, and a mouse may transmit a mouse signal comprising a mouse clock signal and a mouse data signal.

The keyboard connector 10 is coupled to the switching control circuit 20 by the keyboard data signal line KDAT and the keyboard clock signal line KCLK. The mouse connector 12 is coupled to the switching control circuit 20 by the mouse data signal line MDAT and the mouse clock signal line MCLK. The keyboard/mouse controller 14 has a controller input/output system (hereinafter referred to as a controller BIOS), transmitting the keyboard signals and the mouse signals to a host interface 16. For example, the host interface 16 maybe a PCI (Peripheral Component Interconnect) bus, an ISA (Industry Standard Architecture) bus, a LPC (Low Pin Count) bus or the like.

The switching control circuit 20 has a switching circuit 22 and a register 24. The switching circuit 22 is coupled to the keyboard connector 10 and the mouse connector 12 by the keyboard data signal line KDAT, the keyboard clock signal line KCLK, the mouse data signal line MDAT and the mouse clock signal line MCLK. The switching circuit 22 is further coupled to the keyboard/mouse controller by third and fourth groups of signal lines. The register 24 is a flip-flop.

The third group of signal lines comprises a keyboard clock input signal line ($PKCLK_{IN}$), a keyboard data input signal line ($PKDAT_{IN}$), a keyboard data output signal line ($PKDAT_{OUT}$) and a keyboard clock output signal line ($PKCLK_{OUT}$). The fourth group of signal lines comprises a mouse clock input signal line ($PMCLK_{IN}$), a mouse clock output signal line ($PMCLK_{OUT}$), a mouse data input signal line ($KMDAT_{IN}$), and a mouse data output signal line ($KMDAT_{OUT}$).

The register 24 controls the switching control circuit 22 after receiving a control signal SWAP from the host interface 16. When the computer system is turned on, the system BIOS detects whether the keyboard connector 10 and the mouse connector 12 are coupled to the wrong connector by the host interface 16, and then sets the logic level of the control signal SWAP to indicate between a wrong connection or a normal connection. The wrong connection means that the keyboard connector 10 is coupled to a mouse or the mouse connector 12 is coupled to a keyboard.

In the preferred embodiment of the present invention, the default design of the switching control circuit 20 is the keyboard connector is used to couple to a keyboard and the mouse connector is used to couple to a mouse. If a keyboard is coupled to the keyboard connector 10 and a mouse is coupled to the mouse connector 12, the system BIOS detects the connector 10 and 12 is in a normal connection when computer system is turned on. Consequently, the control signal SWAP is at logic high level, and is sent to and store in the register 24 to store. Meanwhile, the switching circuit 22 couples the keyboard clock signal line KCLK to the keyboard clock input signal line $PKCLK_{IN}$ and keyboard clock output signal line $PKCLK_{OUT}$, the keyboard data signal line KDAT to the keyboard data input signal line $PKDAT_{IN}$ and the keyboard data output signal line $PKDAT_{OUT}$, the mouse clock signal line MCLK to the mouse clock input signal line $PMCLK_{IN}$ and the mouse clock output signal line $PMCLK_{OUT}$, and the mouse data signal line MDAT to the mouse data input signal line $PMDAT_{IN}$ and mouse data output signal line $PMDAT_{OUT}$.

On the contrary, if a mouse is coupled to the keyboard connector 10 and a keyboard is coupled to the mouse connector 12, the system BIOS detects the connector 10 and 12 is in a wrong connection when computer system is turned on. Consequently, the control signal SWAP is at logic low level, and is sent to and store in the register 24. Meanwhile, the switching circuit 22 couples the keyboard clock signal line KCLK to the mouse clock input signal line $PMCLK_{IN}$ and the mouse clock output signal line $PMCLK_{OUT}$, the keyboard data signal line KDAT to the mouse data input signal line $PMDAT_{IN}$ and the mouse data output signal line $PMDAT_{OUT}$, the mouse clock signal line MCLK to the keyboard clock input signal line $PKCLK_{IN}$, and keyboard clock output signal line $PKCLK_{OUT}$ and the mouse data signal line MDAT to the keyboard data input signal line $PKDAT_{IN}$ and the keyboard data output signal line $PKDAT_{OUT}$.

Figure 3:
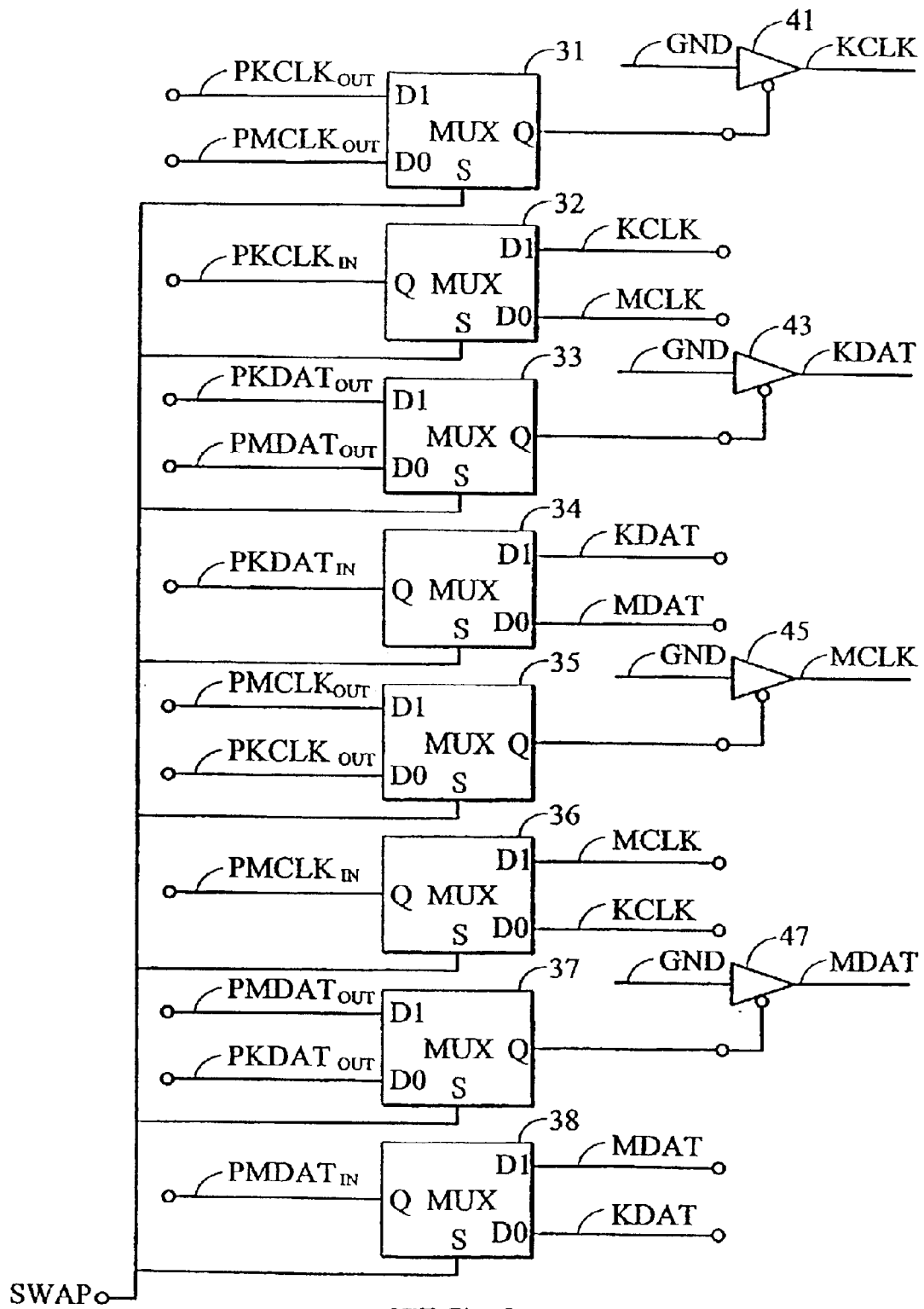
FIG. 3 is a detailed circuit diagram of the switching circuit according to the present invention.

FIG. 3 shows a detailed circuit diagram of the switching circuit 22 shown in FIG. 2. The switching circuit 22 is composed of eight multiplexers 31~38. Each multiplexer 31~38 has two data input terminal D0 and D1, a data output terminal Q and a select terminal S. The data at the data input terminal D1 is sent to the data output terminal Q when the select terminal has a high logic level. Moreover, the data at the data input terminal D0 is sent to the data output terminal Q when the select terminal has a low logic level. The select terminals of each multiplexer 31~38 are coupled to the control signal SWAP.

The multiplexers 31, 33, 35 and 37 receive the signals from the keyboard/mouse controller 14 and output to the keyboard connector 10 and the mouse connector 12. The data input terminals D1 and D0 of the multiplexer 31 are coupled to the keyboard clock output signal line $PKCLK_{OUT}$ and the mouse clock output signal line $PMCLK_{OUT}$ respectively, and the data output terminal Q of the multiplexer 31 is coupled to a active-low enable terminal of a buffer 41 such that the keyboard clock signal line KCLK is coupled to ground. The data input terminals D1 and D0 of the multiplexer 33 are coupled to the keyboard data output signal line $PKDAT_{OUT}$ and the mouse data output signal line $PMDAT_{OUT}$ respectively, and the data output terminal Q of the multiplexer 33 is coupled to an active-low enable terminal of a buffer 43 such that the keyboard data signal line KDAT is coupled to ground. The data input terminals D1 and D0 of the multiplexer 35 are coupled to the mouse clock output signal line $PMCLK_{OUT}$ and the keyboard clock output signal line $PKCLK_{OUT}$ respectively, and the data output terminal Q of the multiplexer 35 is coupled to an active-low enable terminal of a buffer 45 such that the mouse clock signal line MCLK is coupled to ground. The data input terminals D1 and D0 of the multiplexer 37 are coupled to the mouse data output signal line $PMDAT_{OUT}$ and the keyboard data output signal line $PKDAT_{OUT}$ respectively, and the data output terminal Q of the multiplexer 37 is coupled to an active-low enable terminal of a buffer 47 such that the mouse data signal line MDAT is coupled to ground.

The multiplexers 32, 34, 36 and 38 receive the signals from the keyboard connector 10 and the mouse connector 12 and output to the keyboard/mouse controller 14. The data input terminals D1 and D0 of the multiplexer 32 are coupled to the keyboard clock signal line KCLK and the mouse clock signal line MCLK respectively, and the data output terminal Q of the multiplexer 32 is coupled to the keyboard clock input signal line $PKCLK_{IN}$. The data input terminals D1 and D0 of the multiplexer 34 are coupled to the keyboard data signal line KDAT and the mouse data signal line MDAT respectively, and the data output terminal Q of the multiplexer 34 is coupled to the keyboard data input signal line $PKDAT_{IN}$. The data input terminals D1 and D0 of the multiplexer 36 are coupled to the mouse clock signal line MCLK and the keyboard clock signal line KCLK respectively, and the data output terminal Q of the multiplexer 36 is coupled to the mouse clock input signal line $PMCLK_{IN}$. The data input terminals D1 and D0 of the multiplexer 38 are coupled to the mouse data signal line MDAT and the keyboard data signal line KDAT respectively, and the data output terminal Q of the multiplexer 38 is coupled to the mouse data input signal line $PMDAT_{IN}$.

If a keyboard is coupled to the keyboard connector 10 and a mouse is coupled to the mouse connector 12, the control signal SWAP is at high logic level after detecting by the system BIOS 18. The multiplexers 31 and 32 couple the keyboard clock output signal line $PKCLK_{OUT}$ and the keyboard clock input signal line $PKCLK_{IN}$ to the keyboard clock signal line KCLK. Further, the multiplexers 33 and 34 couple the keyboard data output signal line $PKDAT_{OUT}$ and the keyboard data input signal line $PKDAT_{IN}$ to the keyboard data signal line KDAT. Moreover, the multiplexers 35 and 36 couple the mouse clock output signal line $PMCLK_{OUT}$ and the mouse clock input $PMCLK_{IN}$ to the mouse clock signal line MCLK. Furthermore, the multiplexers 37 and 38 make the mouse data output signal line $PMDAT_{OUT}$ and the mouse data input signal line PMDATIN couple to the mouse data signal line MDAT. Namely, the signals output from the keyboard and the mouse are not exchanged. Consequently, the signal at the keyboard data signal line KDAT is the same as the signal at the keyboard data output signal line $PKDAT_{OUT}$ and the keyboard data input signal line $PKDAT_{IN}$, and the signal at the keyboard clock signal line KCLK is the same as the signal at the keyboard clock input signal line $PKCLK_{IN}$ and the keyboard clock output signal line $PKCLK_{OUT}$. Further, the signal at the mouse data signal line MDAT is the same as the signals at the mouse data output signal line $PMDAT_{OUT}$ and the mouse data input signal line $PMDAT_{IN}$, and the signal at the mouse clock signal line MCLK is the same as the signals at the mouse clock input signal line $PMCLK_{IN}$ and mouse clock output signal line $PMCLK_{OUT}$.

If a keyboard is coupled to the mouse connector 12 and a mouse is coupled to the keyboard connector 10, the control signal SWAP is at low logic level after detecting by the system BIOS 18. The multiplexers 31 and 36 couple the mouse clock output signal line $PMCLK_{OUT}$ and the mouse clock input signal line $PMCLK_{IN}$ to the keyboard clock signal line KCLK. Further, the multiplexers 33 and 38 couple the mouse data output signal line $PMDAT_{OUT}$ and the mouse data input signal line $PMDAT_{IN}$ to the keyboard data signal line KDAT. Moreover, the multiplexers 35 and 32 couple the keyboard clock output signal line $PKCLK_{OUT}$ and the keyboard clock input signal line $PKCLK_{IN}$ to the mouse clock signal line MCLK. Furthermore, the multiplexers 37 and 34 couple the signal lines $PKDAT_{OUT}$ and $PKDAT_{IN}$ to the mouse data signal line MDAT. Namely, the signals output from the keyboard and the mouse are exchanged. The signal at the keyboard data signal line KDAT is the same as the signal at the mouse data output signal line $PMDAT_{OUT}$ and the mouse data input signal line $PMDAT_{IN}$, and the signal at the keyboard clock signal line KCLK is the same as the signal at the mouse clock input signal line $PMCLK_{IN}$ and mouse clock output signal line $PMCLK_{OUT}$. Further, the signal at the mouse data signal line MDAT is the same as the signals at the keyboard data output signal line $PKDAT_{OUT}$ and keyboard data input signal line $PKDAT_{IN}$, and the signal at the mouse clock signal line MCLK is the same as the signals at the keyboard clock input signal line $PKCLK_{IN}$ and the keyboard clock output signal line $PKCLK_{OUT}$.

Therefore, the keyboard/mouse controller can still manage the keyboard signal and the mouse signal correctly without changing the controller BIOS by switching signals using the switching circuit 20 even if the keyboard and the mouse are coupled to wrong connectors. According to the present invention, the keyboard/mouse switching controller can automatically switch the keyboard signal and the mouse signal without re-assembling the hardware, thereby allowing for easy assembly of a computer.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A keyboard/mouse switching controller, comprising:
    a keyboard connector;
    a mouse connector;
    a first group of signal lines and a second group of signal lines coupled to the keyboard connector and the mouse connector respectively, the first group of signal lines for receiving a first group of signals from the keyboard connector, and the second group of signal lines for receiving a second group of signals from the mouse connector;
    a detector for transmitting a control signal; wherein the control signal is at low level state when a mouse is connected to the keyboard connector or a keyboard is connected to the mouse connector, and the control signal is at high level state when a keyboard is connected to the keyboard connector or a mouse is connected to the mouse connector;
    a controller coupled to the detector for controlling the first group of signals and the second group of signals output to the detector;
    a third group of signal lines and a fourth group of signal lines coupled to the controller; and
    a switching control circuit for coupling the first and second group of signals to the third and fourth group of signal lines respectively when the control signal is at high level state, and for coupling the first and second group of signals to the fourth and third group of signal lines respectively when the control signal is at the low level state.

2. The keyboard/mouse switching controller of claim 1, wherein the detector is a system BIOS.

3. The keyboard/mouse switching controller of claim 1, wherein the switching circuit comprises:
    a data storage unit coupled to the detector for storing the low level state or the high level state of the control signal.

4. The keyboard/mouse switching controller of claim 3, wherein the data storage unit is a flip-flop.

5. The keyboard/mouse switching controller of claim 1, wherein the first group of signals is a group of keyboard signals composed of a keyboard clock signal and a keyboard data signal.

6. The keyboard/mouse switching controller of claim 1, wherein the second group of signals is a group of mouse signals composed of a mouse clock signal and a mouse data signal.

7. The keyboard/mouse switching controller of claim 3, wherein the switching circuit comprise:

a first group of multiplexers coupled to the first group of signal lines and the second group of signal lines for serving as input terminals and coupled to the third group of signal lines for serving as an output terminal;

a second group of multiplexers coupled to the first group of signal lines and the second group of signal lines for serving as input terminals and coupled to the fourth group of signal lines for serving as an output terminal;

a third group of multiplexers coupled to the third group of signal lines and the fourth group of signal lines for serving as input terminals and coupled to the first group of signal lines for serving as an output terminal; and a fourth group of multiplexers coupled to the third group of signal lines and the fourth group of signal lines for serving as input terminals and coupled to the second group of signal lines for serving as an output terminal.

8. The keyboard/mouse switching controller of claim 5, wherein the first group of signal lines comprises a keyboard clock signal line and a keyboard data signal line, the second group of signal lines comprises a mouse clock signal line and a mouse data signal line;

the third group of signal lines comprises a keyboard clock input signal line ($PKCLK_{IN}$), a keyboard data input signal line ($PKDAT_{IN}$), a keyboard data output signal line ($PKDAT_{OUT}$) and a keyboard clock output signal line ($PKCLK_{OUT}$);

the fourth group of signal lines comprises a mouse clock input signal line ($PMCLK_{IN}$), a mouse clock output signal line ($PMCLK_{OUT}$), a mouse data input signal line ($PMDAT_{IN}$), and a mouse data output signal line ($PMDAT_{OUT}$);

the switching circuit receiving a keyboard clock signal, a keyboard data signal, a mouse clock signal and a mouse data signal by the first group of signal lines and the second group of signal lines, and outputting to the controller through the keyboard clock input signal line ($PKCLK_{IN}$), the keyboard data input signal line ($PKDAT_{IN}$), the mouse clock input signal line ($PMCLK_{IN}$) and the mouse data input signal line ($PMDAT_{IN}$).

9. The keyboard/mouse switching controller of claim 8, wherein the switching circuit comprises:

a first multiplexer coupled to the keyboard clock signal line and the mouse clock signal line for serving as input terminals and coupled to the keyboard clock input signal line ($PKCLK_{IN}$) for serving as an output terminal;

a second multiplexer coupled to the keyboard data signal line and the mouse data signal line for serving as input terminals and coupled to the keyboard data input signal line ($PKDAT_{IN}$) for serving as an output terminal;

a third multiplexer coupled to the keyboard clock signal line and the mouse clock signal line for serving as input terminals and coupled to the mouse clock input signal line ($PMCLK_{IN}$) for serving as an output terminal; and a fourth multiplexer coupled to the keyboard data signal line and the mouse data signal line for serving as input terminals and coupled to the mouse data input signal line ($PMDAT_{IN}$) for serving as an output terminal.

10. The keyboard/mouse switching controller of claim 9, wherein the switching circuit further comprises:

a fifth multiplexer coupled to the keyboard clock output signal line ($PKCLK_{OUT}$) and the mouse output clock signal line ($PKCLK_{OUT}$) for serving as input terminals and coupled to the keyboard clock signal line for serving as an output terminal;

a sixth multiplexer coupled to the keyboard data output signal line ($PKDAT_{OUT}$) and the mouse data output signal line ($PMDAT_{OUT}$) for serving as input terminals and coupled to the keyboard data signal line for serving as an output terminal;

a seventh multiplexer coupled to the mouse clock output signal line ($PMCLK_{OUT}$) and the keyboard clock output signal line ($PKCLK_{OUT}$) for serving as input terminals and coupled to the mouse clock signal line for serving as an output terminal; and a eighth first multiplexer coupled to the keyboard data output signal line ($PKDAT_{OUT}$) and the mouse data output signal line ($PMDAT_{OUT}$) for serving as input terminals and coupled to the mouse clock signal line for serving as an output terminal.

11. A method of controlling keyboard/mouse switching, comprising:

detecting whether a keyboard is connected to a keyboard connector or a mouse is connected to a mouse connector;

outputting a control signal at a high level state when the keyboard is connected to the keyboard connector or the mouse is connected to the mouse connector, and outputting a control signal at the low level state when the keyboard is connected to the mouse connector or the mouse is connected to the keyboard connector;

coupling a first group of signal lines connected to the keyboard connector to a third group of signal lines connected to a controller and a second group of signal lines connected to the mouse connector to a fourth group of signal lines connected to the controller when the control signal is at high level state; and coupling the first group of signal lines connected to the keyboard connector to a fourth group of signal lines connected to a controller and the second group of signal lines connected to the mouse connector to the third group of signal lines connected to the controller when the control signal is at low level state.

12. The method of controlling keyboard/mouse switching of claim 11, wherein the keyboard connector and the mouse connector are PS/2 connectors.

* * * * *